United States Patent [19]

O'Brien et al.

[11] Patent Number: 4,933,052

[45] Date of Patent: Jun. 12, 1990

[54] PROCESS FOR THE PREPARATION OF CONTINUOUS BILAYER ELECTRONICALLY-CONDUCTIVE POLYMER FILMS

[75] Inventors: R. N. O'Brien, Victoria, Canada; K. S. V. Santhanam, Bombay, India

[73] Assignee: University of Victoria, Canada

[21] Appl. No.: 252,382

[22] Filed: Oct. 3, 1988

Related U.S. Application Data

[62] Division of Ser. No. 64,468, Jun. 22, 1987, Pat. No. 4,874,735.

[51] Int. Cl.$^5$ ............... C25D 11/08; C25B 3/02
[52] U.S. Cl. ............... 204/58.5; 204/59 R; 204/72; 204/78
[58] Field of Search ............... 204/58.5, 59 R, 72, 204/78

[56] References Cited

U.S. PATENT DOCUMENTS

| | | | |
|---|---|---|---|
| 4,468,291 | 8/1984 | Naarmann et al. | 204/78 |
| 4,547,270 | 10/1985 | Naarmann | 204/59 R |
| 4,559,112 | 12/1985 | Tamamura et al. | 204/59 R |
| 4,569,734 | 2/1986 | Naarmann et al. | 204/78 |
| 4,608,129 | 8/1986 | Tamamura et al. | 204/59 R |
| 4,636,430 | 1/1987 | Moehwald | 204/78 |
| 4,728,399 | 3/1988 | Moehwald | 204/78 |

OTHER PUBLICATIONS

Chemical Abstract 104:8246w, O'Brien et al.
O'Brien et al, "Laser Interferometry of Pulsed Galvanostatic Deposition of Polycarbazole", J. Electrochem. Soc 132(11) 2613–2616 (1985).
Chemical Abstract 103:185780r, O'Brien et al.

*Primary Examiner*—John F. Niebling
*Assistant Examiner*—Steven P. Marquis
*Attorney, Agent, or Firm*—Saidman, Sterne, Kessler & Goldstein

[57] ABSTRACT

A process is provided for the preparation of an article having a continuous metal substrate, and a coherent continuous coating thereon of a bilayer electronically-conductive continuous film comprising a continuous film of a polycarbazole on a continuous polypyrrole substrate, said process comprising:

electrodepositing a continuous film of a polycarbazole on a continuous metal anode having a continuous film of a polypyrrole substrate thereon.

29 Claims, No Drawings

PROCESS FOR THE PREPARATION OF CONTINUOUS BILAYER ELECTRONICALLY-CONDUCTIVE POLYMER FILMS

This application is a division of application Ser. No. 064,468, filed Jun. 22, 1987, now U.S. Pat. No. 4,874,735, issued Oct. 7, 1985.

BACKGROUND OF THE INVENTION (i) Field of the Invention

This invention relates a process for the preparation of to bilayer electronically-conducting films which are coated on electrodes and to processes for their production. This invention also relates a process for the preparation of to bilayer electronically-conducting films which have been stripped from the electrode so-coated.

(ii) Description of the Prior Art

The production of films on electrodes is old. Many such films were electrically non-conducting. For example, U.S. Pat. No. 1,904,418, patented Apr. 18, 1933 by C. Dantsizen, provided an insulating film on conductors in motors by making the winding the anode and then passing an electric current through an electrolyte, using a part of the stator itself or any other suitable conductor as the cathode.

U.S. Pat. No. 4,295,951, patented Oct. 20, 1981, by T. Bommaraja et al, provided a film-coated cathode for the electrolysis of alkali metal halide solutions in the substantial absence of chromium ions. The cathode comprised a conductive substrate, e.g. titanium, steel, iron, or alloys thereof, coated with an adherent, porous film of a substantially-electrically-non-nonconductive material having an average coating thickness of less than $10^3$ microns. Such material was said to be chemically inert in the halate solution.

U.S. Pat. No. 3,477,924, patented Nov. 11, 1961, by R. S. Gregorian et al, provided an electropolymerization process for foming a polyarylene oxide by maintaining an electric potential between electrodes immersed in a basic aqueous solution of a hydroxylated aromatic compound. The electrically-conductive polymer was said to be recoverable as a coating on the anode.

Carbazole-based materials, e.g., polycarbazoles, are well known in the prior art as photoconductive materials. Many photoconductive elements have been prepared which used such polyvinyl carbazoles and related materials. The prior art contains a large body of patents and articles concerned with the preparation and use of materials prepared from carbazoles. Polyvinylcarbazole polymers prepared from N-vinylcarbazole have been found to function in a useful manner in photoconductive layers. The prior art has also been concerned with electrophotographic materials of this type formed by substitution by various constituents on aromatic portions of the carbazole molecule.

U.S. Pat. No. 4,111,850, patented Sept. 5, 1978, by W. D. Kwalwasso, provided carbazole-based, molecular, photoconductive charge-transfer complexes which were easily applied to electrode substrates. The carbazole-based complexes comprised 3-substituted carbazoles complexed with an electron acceptor molecule, e.g. 2,4,7-trinitrofluorenone. The patentee also provided methods for contructing photoconductive elements on thin, semitransparent flexible substrates, the photoconductors being applied from solution or suspension in a fast drying liquid onto an electrode assembly attached to a flexible plastic substrate.

U.S. Pat. No. 4,386,987, patented Jun. 7, 1983 by M. J. Covitch et al provided a method of forming a membrane upon an electrode from a dispersed, perflourocarbon copolymer. The perfluorocarbon polymer was dispersed in a solvating medium, a substantial portion being solvated. The dispersion was applied to an electrode and the dispersion medium was removed.

The prior art has also been concerned with electrically-conductive polymer films. U.S. Pat. No. 4,461,691, patented Jul. 24, 1984 by A. J. Frank provided electrodes overcoated with electrically-conductive polymer films. The electrodes typically comprised an inorganic semiconductor overcoated with a charge-conductive polymer film comprising a charge-conductive polymer in or on which was a catalyst or charge-relaying agent.

U.S. Pat. No. 4,476,003, patented Oct. 9, 1984 by A. J. Frank et al provided a method of coating electrodes with electrically-conductive polymer films. The charge-conductive polymer was covalently or coordinatively attached to the surface of the electrode to strengthen the adhesion characteristics of the polymer to the electrode surface or to improve charge-conductive properties between the conductive polymer and the electrode surface. Covalent or coordinative attachment was said to be achieved by a number of alternative methods including covalently or coordinatively attaching the desired monomer to the electrode by means of a suitable coupling reagent and, thereafter, electrochemically polymerizing the monomer in situ.

Polymer-coated electrodes have gained considerable attention for two reasons. An electrically-conducting polymer film on an electrode is believed to be useful for a particular chemical reaction over a wide range of potentials and hence may reduce unwanted side reactions. It is further believed that such film is itself catalytic or can easily absorb a catalyst and so can accelerate a desired reaction in some circumstances. It is also believed that the deposited polymer may be both electronically-conducting and an ion-exchange membrane, or may be only electronically-conducting. Both of these forms of conductivity are believed to be essentially functional diodes, (i.e. they conduct charge in only one direction) or may give some degree of rectification.

SUMMARY OF THE INVENTION

Aims of the Invention

One object of this invention then is to provide a layered polymer film or membrane, which film or membrane is electronically-conductive.

Another object of this invention is to provide such a layered polymeric film which may have different conductivities and varying thicknesses to produce a rectifying membrane.

Yet another object of this invention is to provide a process for the preparation of such a layered polymeric film which can be made ion selective (i.e. which can pass only one type of ion, either a cation or an anion).

Another object of this invention is to provide a process for the preparation of such layered polymeric films which are catalytically-selectively, or which can have catalysts, i.e., iron pthalocyanine or polycarbazole, absorbed on them, or which can have catalysts absorbed or adsorbed interstitially as well as at the electrolyte surface, in which the absorbed or adsorbed (sorbed) catalysts can be finely divided, so that, by adjustment of conditions, e.g., potential, type of catalyst, etc. clean specific chemical reactions can be favored.

Yet another object of this invention is to provide a process for the preparation of strippable coatings by depositing the coating on easily-anodically-dissolvable metals, e.g. Cu, Ag and Au, and then providing a rim or grid of metal to support the coating as a membrane.

Still another object of this invention is to provide a process for the preparation of such supported strippable membranes for use as reverse osmosis membranes or as ion-exchange membranes as well as catalytic electrodes to separate chemical reactants and products.

Statements of Invention

This invention now provides a process for the preparation of an article having a continuous metal substrate, and a coherent continuous coating thereon of a bilayer electronically conductive continuous film comprising a continuous film of a polycarbazole on a continuous polypyrrole substrate, the process comprising: electrodepositing a continuous film of a polycarbazole on a continuous metal anode having a continuous polypyrrole substrate thereon.

The present invention thus provides the electrodeposition of an electronically-conductive layer of polycarbazole on a polypyrrole anode, which may be performed galvanostatically, or by pulsed electrolysis, in a suitable aprotic solvent, (e.g. a type of solvent which does not offer or accept protons, i.e. N,N-dimethyl formamide or benzene) containing a suitable electrolyte which is soluble in the selected aprotic solvent, e.g., tetra-n-butyl ammonium perchlorate, in the medium.

Other Features of the Invention

By one feature of this invention, the electrodeposition may be conducted by galvanostatic electrolysis in an aprotic solvent containing an electrolyte which is soluble in the selected aprotic solvent.

By another feature of this invention, the electrodeposition may be conducted by pulsed electrolysis in an aprotic solvent containing an electrolyte soluble in the selected aprotic solvent.

According to still further features of this invention, whether the electrodeposition is by galvanostatic electrolysis or by pulsed electrolysis, the continuous metal anode may be prepared by electrodeposition of polypyrrole either by galvanostatic electrolysis of pyrrole in an aprotic solvent containing an electrolyte which is soluble in the selected aprotic solvent, or by pulsed electrolysis of pyrrole in an aprotic solvent containing an electrolyte which is soluble in the selected aprotic solvent.

It is preferred that the aprotic solvent be N,N-dimethyl formamide, and that the electrolyte be tetra-n-butyl ammonium perchlorate.

It has been found that polycarbazole can be deposited over polypyrrole. The layered polymer is electronically-conductive. Polycarbazole as the outside (electrolyte side) layer is more adaptable to absorption of catalytic materials and has ion-exchange properties.

By another feature of the invention, the metal substrate should be selected from the group consisting of gold, silver, copper, ruthenium, rhodium, palladium, osmium, irridium, platinum, iron, cobalt or nickel. It has been found that more durable, unsupported membrane/catalysts can be produced by forming the membranes on a silver or copper substrate (preferably with a few atomic layers of platinum or gold evaporated onto the surface). The silver or copper is anodically dissolved except for a frame of protected metal around the outside or a supporting grid of protected metal.

By yet another feature of the invention, the articles may have a catalyst absorbed on either or both of the polycarbazole film or the polypyrrole film, e.g. wherein a film of a polypyrrole is deposited over a film of a polycarbazole having a catalyst absorbed thereon, or wherein a film of a polycarbazole is deposited over a film of a polypyrrole having a catalyst absorbed thereon or wherein a catalyst is absorbed on a film of a polypyrrole which is deposited over a film of a polycarbazole having a catalyst absorbed thereon, or wherein a catalyst is absorbed on a film of a polycarbazole which is deposited over a film of a polypyrrole having a catalyst absorbed thereon.

By other features of this invention, it has been found that combinations of these bilayer films with absorbed catalysts on either the inner or outer layer, or both, is selectively catalystic and/or is rectifying. The ready absorption and/or chemical attachment of catalysts in finely divided condition is easily attained. In stripped membranes, a combination (in very thin membranes) of reverse osmosis (by gentle pressure) and ion selectivity allows easy separation of product from reactant.

Thus, it has been found that successive layers of the above-identified different polymers with different conductive capabilities, catalytic capabilities and absorptive characteristics can be laid down on a suitable electrode and can be used as electrodes or may be stripped and used as membranes.

DESCRIPTION OF PREFERRED EMBODIMENTS

The following are examples of embodiments of this invention.

EXAMPLES

Electrodeposition were carried out in electrochemical cells. The cell dimensions are 1.39 mm. thick, 3 cm. long and 1.3 cm in. radius. Semicircular glass discs had the same dimensions so as to fit into the above cell and were used to provide the electrodes. Pt-coated glass disc electrodes were mounted in the cell in a parallel configuration. A few examples were also performed using gold-coated glass flats. The optical glass flats were placed on either side of the electrodes and clamped in a brass cell holder.

The electrodes were prepared as follows:

Several semicircular glass discs were cut from optical grade glass plates of the dimensions 3 cm long and 1.3 cm radius. They were cleaned in a chromic acid bath for 4 h. Later, they were washed with water and alcohol. This precedure was adopted to remove the grease and organic matter from the glass discs. For platinum deposition, a layer of chromium oxide, then a layer of platinum was vacuum deposited on these discs. For gold deposition, no binder was used as gold adheres well to glass. During deposition, the curved region and the flat portions were masked with regenerated cellulose tapes, leaving only the long side of the disc exposed for the metal deposition. The thickness of the deposited layers of platinum or gold was between 1000–3000 Å. The glass discs were stored in a Petri dish until used.

Among the chemicals, anhydrous N,N-dimethylformamide (DMF, MCB reagent grade) was used. Tetra n-butyl ammonium perchlorate (South Western Analytical Chemicals) was dried at 100° C. for 24 h. in a drying piston under vacuum before using it as the supporting electrolyte. The dried sample was placed in a dessicator for longer periods of storage. Pyrrole was freshly distilled and the fraction boiling at 120° was used in the experiments.

The electrode was then prepared as follows:

Galvanostatic electrolysis was performed using a KEITHLEY constant current source (Model 220) in combination with a WAVETEK function generator (Model 111). The c.d.'s were adjusted to 0.10–2.0 mAcm$^2$ and the cell voltages were followed using a TEKTRONIX type 561A oscilloscope with type 3A6 dual trace amplifier and type 3B3 time base. Linear sweep voltammetry was performed using a Pt wire (A 0.14 cm$^2$) as the working electrode and a silver wire as the reference electrode. The experiment was performed using a PAR Model 273 potentiostat/galvanostat programmed through an Apple IIe computer arranged to give a printout of the current-voltage curve on an EPSON printer/plotter. The working electrode was cleaned in conc. HNO$_3$ and flamed over an alcohol burner for a few minutes. The electrochemical cell used in the experiment was H-shaped for separating the working and counter electrodes.

Polycarbazole film was electrodeposited on a semicircular glass flat coated with either gold or platinum by galvanostatic electrolysis of 60 mM carbazole containing 0.1M tetra-n-butyl ammonium perchlorate in a solvent DMF. The c.d.'s employed in the deposition was adjusted from 0.10–0.40 mAcm$^2$. The duration of the electrolysis was controlled from 360 s to 900 s. At the end of the electrolysis, the polycarbazole film was washed in DMF several times and allowed to dry before use in the other examples described henceforth.

Polypyrrole was electrodeposited on the polycarbazole film at different c.d.'s ranging from 0.10 mAcm$^2$ using a polycarbazole (pC) anode. The deposition was performed both by the galvanostatic and pulsed galvanostatic electrolysis (frequency range of 1–50 Hz).

OPERATION OF PREFERRED EMBODIMENTS (i) Test Results

Test results were obtained as follows.

The interferometer set up is a Fabry-Perot type using 1 mW He-Ne laser with λ=632.8 nm. Fizeau type multiple beam wedge fringes were generated.

A holographic laser interferometric set up included a 5 mW He-Ne laser (SPECTRA PHYSICS) with a collimator which produced a parallel beam which was divided into two parts by the beam splitter. One part of the beam passed through the electrochemical cell and the other part was reflected by a mirror (COHERENT OPTICS INC., Model 58). Both the beams were condensed on a reference plate (Type 849F, KODAK) to make a halogram. The interference fringes generated by this process (viewing the working cell through the halogram) are viewed through a 35 mm camera, using a video camera and a monitor. The intensity of the light beam passing through the electrochemical cell was attenuated by a neutral density filter (2.5% transmission).

The laser interferometric fringes were video recorded using a HITACHI videorecorder (VTR Model VT-7A) and displayed on a HITACHI 20 in videomonitor. The fringes were viewed through a NIKON 35 mm camera and an RCA CCO30 microprocessor controlled camera. The video recordings were titled and the progress of the electrolysis was indicated on the displayed clock on the screen to one tenth of a second.

The impressed cell voltage vs time during the electrodeposition compared with the electrodeposition of polypyrrole at a platinum electrode shows differences in the impressed voltage - time curves which are suggested of the overall conductivities in the two systems i.e., platinum/polypyrrole and platinum/polycarbazole/polypyrrole.

The deposition of polypyrrole at a platinum anode was followed by multiple beam laser interferometry. Examination of the interferograms generated by the galvanostatic electrolysis at 0.40 mAcm$^2$. Show a smooth up turn of the fringes at the anode indicating a decrease in the refractive index of the medium in that region. At this electrode, pyrrole is oxidized to a radical cation which is followed by a radical coupling reaction, loss of a proton which is then followed by polymerization. The overall scheme involves an initial one electron oxidation at the electrode. The fringe shift ($F_{max}$) during this deposition varied linearly with the square root of electrolysis time suggesting a diffusion controlled oxidation in accord with Sand's equation.

The concentration-distance profiles during the above electrolysis have been plotted. The growth of the diffusion layer during the electrodeposition of polypyrrole is shown by the fringe shifts caused by the depletion of pyrrole in the electrode-solution interface. At higher c.d.'s (>0.50 mAcm$^2$, the fringe shift increases up to 180 s of electrolysis and thereafter it declines. Such a trend is not observed in the electrodeposition of polycarbazole. This decline in fringe shift is attributed to the destruction of the conducting polypyrrole at high c.d.'s due to a reduced $\pi$-conjugation in the polymer; at higher c.d.'s there is also a hydrodynamic (convection) effect observed in the interferograms. This feature was also observed in the electrodeposition of polypyrrole on a platinum substrate.

The holographic interference fringes during the deposition of polypyrrole at a polycarbazole anode revealed features which were similar to multiple beams laser interferometry. The cell employed here was a 1 cm glass cell which had the advantage of using a wider separation between the anode and cathode (0.8 cm compared to 0.4 cm). Concentration changes were observed during an electrodeposition at a c.d. of 0.40 mAcm$^2$. The fringe shifts were monitored continuously for 600 s and the progressive growth of the diffusion layer was clearly discernable in the interference fringes. At high c.d. (>0.80 mAcm$^2$) hydrodynamic flow-liquid flowing from the top of the electrode to the bottom of the cell was observed. The onset of convection was observed at 60 s of electrolysis and then continues throughout the electrolysis.

The pulsed electrodeposition of polypyrrole was also conducted in the frequency range of 0.1 Hz to 100 Hz at c.d.'s ranging from 0.1 to 2.5 mAcm$^2$. The galvanostatic pulsed current amplitude in these experiments oscillates symmetrically from positive to negative potentials. Two aspects are markedly apparent from the results: (a) as the c.d. reversal occurs during a pulsing period, the polymeric carbazole is reduced and this reduced state has a lower conductivity; and (b) polypyrrole reduction does not occur resulting in the outer layers remaining in the conducting state. As laser interferometry shows the average distribution of the refractive index of a medium, it may show the relaxation and growth of the fringes that occur on pulsing at the electrode-solution region. This development would be expected to occur, if the potential of the electrode moved past the redox potential of the polymers. For polypyrrole, the redox potential is estimated at 0.20 V vs SCE. The magnitude of the cell voltage in a galvanostatic electrolysis is governed by the interfacial concentration of pyrrole or its radical and is expected to change periodically (as in the double layer capacitance which must change with the solution resistance) as the potential of the electrode is changed. The effect of frequency upon a pulsed electrodeposition of polypyrrole shows that when the electrolysis was conducted at lower frequencies (<10 Hz) the oscillating potential range (the maximum ($V_{max}$) and minimum ($V_{min}$) spans a wider range with $V_{min}$ reaching negative values relative to the $V_{max}$ and relative to V=O. These features are similar to the electrodeposition of polycarbazole when the potentials of the system remain in the positive regions.

The laser interferometric fringes produced during a bilayer formation in pulsed electrodeposition at different frequencies arises due to the factors discussed earlier. The contraction of the diffusion layer during a pulsed electrodeposition of polypyrrole is indicated in concentration vs distance plots. The effect of the frequency is to re-reduce the product of pyrrole oxidation and this happens more at the higher frequencies as shown by the oscillating potential. As a result at higher frequencies the concentration gradients are smaller. At higher frequencies the effective c.d.'s would be smaller partly caused by the periodic double layer resistance change and the potential ($V_{min}$) remaining in the positive region. It can be shown that the electrodeposition of polypyrrole at a polycarbazole anode is proceeding in a diffusion controlled manner in the c.d.'s below 0.50 mAcm$^1$. However, at the higher c.d.'s the onset of convection in the electrochemical cell produced larger deviation; this convection is caused by the gas evolution at one of the electrodes.

The pulsed electrolytic deposition of polypyrrole generates concentration - distance plots show that the development of these profiles is smooth during the deposition which indicates the depletion of pyrrole ($\omega$=O) continuously occuring with no hydrodynamic factors operating at the c.d.'s. When the frequency is changed to a higher value (50 Hz–100 Hz), again the development of the concentration-distance plots shows a similar behaviour except that the actual values of these concentrations at any selected instant are smaller. This difference is attributed to the response time of the polycarbazole anode for oxidizing pyrrole in the medium. With a metal electrode, e.g. platinum, this response time is faster and generally such differences in concentrations are seldom observed. The pulsed deposition produces a visually smooth good black deposit on the polycarbazole anode.

In comparing the pulsed electrodeposition of polypyrrole at a bilayer electrode with a metallic electrode, it is seen that to obtain a good smooth deposition, the frequency and c.d. both have to be controlled such that $V_{max}$ and $V_{min}$ remain in the positive regions. Thus, at the lower c.d.'s, higher frequencies, e.g. 50 Hz optimizes the electrodeposition. At this frequency, the reduction of the pyrrole 1e oxidation product occurs, thus keeping the pyrrole concentration higher at the electrode surface. While this process should continuously occur at any other lower frequency when the potential $V_{max}$ passes to the negative region, there is an additional feature of the reduction of the polymer would also occur; this reduction results in reduction of the polymer conductivity to a minimum. As the purpose of the pulsed deposition is to enhance the substrate concentration at the electrode-solution interface and also to reduce the thickness of the diffusion layer, frequency optimization would be required in routine electrodeposition.

The development of the concentration gradient during the pulsed deposition of polypyrrole at a metal substrate is comparable to a polycarbazole anode.

The electrochemical oxidation of pyrrole or a polycarbazole anode shows an irreversible anodoic peak at $E_{pa}$=1.88 V and a cathodic peak at $E_{pc}$=+0.10 V. Further reversal of scan at potentials past zero volts shows a broad anodic peak at 0.20 V. These features are very characteristic of polypyrrole films. An interesting aspect of the oxidation at the polycarbazole anode is the displacement of the anodic peak of pyrrole by about 150 mV in the cathodic direction with respect to a metal electrode. The current-voltage curve for the oxidation of pyrrole at a polycarbazole anode were observed in the repetitive cycling. The current-voltage curve for a polypyrrole film in a background solution reveals the features observed in a polypyrrole film contained on a polycarbazole anode: the cathodic peak is broadened at this electrode. The distinctive feature of this electrode is that the electrodeposited polypyrole film is black lying over a brown surface of polycarbazole (when a thin film of 5000Å is present on the metal substrate). The polypyrrole film activity was observed by the anodic and cathodic peaks changing linearly with scan rate as expected for a surface attached species. The film activity towards the oxidation of hydroquinone was examined in aqueous $H_2SO_4$ medium. The oxidation is electrocatalysed and the peak current for an identical concentration of $H_2O$ at a naked platinum electrode is 1.60 times less suggesting the bilayer electrode has an electrocatalytic activity.

The surface morphology of the bilayer electrode was also examined. The structure of polypyrrole deposited on a polycarbazole anode shows that the polypyrrole surface is more densely packed than those previously observed on a metal substrate. The surface view resembles that of a binary alloy having quite porous structure.

The growth of the diffusion layer was continuously observed during electrodeposition and was found to be at variance with the electrodeposition of polypyrrole on metal substrates. The electrodeposition of polypyrrole on a polycarbazole anode was also examined by the linear sweep voltammetric technique. The oxidation of pyrrole was reflected in the current-voltage curve at this electrode. The results obtained strongly suggest that bilayer conducting films can be generated and that such a bilayer electrode shows potentialities as an electrode material. The bilayer film has been probed by the scanning electron microscope for its structure and it shows a smoothly packed, compact structure.

(ii) Examples of Catalysis

As an example of catalysts, polycarbazole is catalytic towards oxygen reduction, by itself, or with iron phthalocyanine absorbed by 200 mv or approximately a 16% reduction in potential is achieved. Since the potential is the argument of an exponential, this could be a considerable saving in time. One type of bilayer electrode shows catalytic behaviour for the oxidation of hydroquinnone. The results obtained suggest the bilayer polymeric electrode has the potentiality for use as an electrode material in electrochemical cells.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What we claim is:

1. A process for the preparation of an article having a continuous metal substrate, and a coherent continuous coating thereon of a bilayer, electronically-conductive, continuous film comprising a continuous film of a polycarbazole on a continuous film of a polypyrrole substrate, said process comprising: electrodepositing a continuous film of said polycarbazole on a continuous metal anode having a continuous film of said polypyrrole substrate thereon.

2. The process of claim 1 further comprising the step of absorbing a catalyst onto said polycarbazole layer of said continuous film to provide an electronically-conductive, continuous film with catalytic properties.

3. The process of claim 2 wherein said catalyst is iron phthalocyanine.

4. The process of claim 1 wherein said electrodeposition is conducted by galvanostatic electrolysis in an aprotic solvent containing an electrolyte which is soluble in said selected aprotic solvent.

5. The process of claim 4 wherein said continuous metal anode is prepared by galvanostatic electrolysis of pyrrole in an aprotic solvent containing electrolyte which is soluble in said selected aprotic solvent.

6. The process of claim 5 wherein said aprotic solvent is N,N-dimethyl formamide.

7. The process of claim 5 wherein said electrolyte is tetra-n-butyl ammonium perchlorate.

8. The process of claim 5 wherein said aprotic solvent is N,N-dimethyl formamide and wherein said electrolyte is tetra-n-butyl ammonium perchlorate.

9. The process of claim 4 wherein said aprotic solvent is N,N-dimethyl formamide.

10. The process of claim 4 wherein said continuous metal anode is prepared by pulsed electrolysis of pyrrole in an aprotic solvent containing an electrolyte which is soluble in said selected aprotic solvent.

11. The process of claim 10 wherein said aprotic solvent is N,N-dimethyl formamide.

12. The process of claim 10 wherein said electrolyte is tetra-n-butyl ammonium perchlorate.

13. The process of claim 10 wherein said aprotic solvent is N,N-dimethyl formamide and wherein said electrolyte is tetra-n-butyl ammonium perchlorate.

14. The process of claim 4 wherein said aprotic solvent is N,N-dimethyl formamide and wherein said electrolyte is tetra-n-butyl ammonium perchlorate.

15. The process of claim 4 wherein said electrolyte is tetra-n-butyl ammonium perchlorate.

16. The process of claim 4 further comprising the step of absorbing a catalyst onto said polycarbazole layer of said continuous film to provide an electronically-conductive, continuous film with catalytic properties.

17. The process of claim 16 wherein said catalyst is iron phthalocyanine.

18. The process of claim 1 wherein said electrodeposition is conducted by pulsed electrolysis in an aprotic solvent containing an electrolyte which is soluble in said selected aprotic solvent.

19. The process of claim 18 wherein said aprotic solvent is N,N-dimethyl formamide.

20. The process of claim 18 further comprising the step of absorbing a catalyst onto said polycarbazole layer of said continuous film to provide an electronically conductive, continuous film with catalytic properties.

21. The process of claim 18 wherein said electrolyte is tetra-n-butyl ammonium perchlorate.

22. The process of claim 18 wherein said continuous metal anode is prepared by galvanostatic electrolysis of pyrrole in an aprotic solvent containing an electrolyte which is soluble in said selected aprotic solvent.

23. The process of claim 22 wherein said aprotic solvent is N,N-dimethyl formamide.

24. The process of claim 22 wherein said electrolyte is tetra-n-butyl ammonium perchlorate.

25. The process of claim 22 wherein said aprotic solvent is N,N-dimethyl formamide and wherein said electrolyte is tetra-n-butyl ammonium perchlorate.

26. The process of claim 18 wherein said continuous metal anode is prepared by pulsed electrolysis of pyrrole in an aprotic solvent containing an electrolyte which is soluble in said selected aprotic solvent.

27. The process of claim 26 wherein said aprotic solvent is N,N-dimethyl formamide.

28. The process of claim 26 wherein said electrolyte is tetra-n-butyl ammonium perchlorate.

29. The process of claim 26 wherein said aprotic solvent is N,N-dimethyl formamide and wherein said electrolyte is tetra-n-butyl ammonium perchlorate.

* * * * *